INVENTOR.
JEROME R. PIER

United States Patent Office 3,443,842
Patented May 13, 1969

3,443,842
AUTOMATED CONTROL OF RAILWAY BRAKE EQUIPMENT HAVING DYNAMIC AND AIR BRAKING
Jerome R. Pier, Export, Pa., assignor to Westinghouse Air Brake Company, Wilmerding, Pa., a corporation of Pennsylvania
Filed Oct. 27, 1966, Ser. No. 590,037
Int. Cl. B60t 8/08, 13/66
U.S. Cl. 303—20      15 Claims

ABSTRACT OF THE DISCLOSURE

A brake control system utilizing a closed-loop feedback scheme including dynamic braking means, pneumatic braking means, load compensating means, braking feedback means and blending means to control brake signals for regulating brake shoe force to maintain a regulated retarding force in accordance with the vehicle rate of retardation, vehicle load and the degree of dynamic braking, effective to provide consistent stop distance for any specific brake application automatically. A modification utilizes load cells measuring retarding torque force on the brake shoe hangers instead of utilizing vehicle rate of retardation.

Background of invention

In all friction braking materials, the coefficient of friction is inversely proportional to rubbing speed of the brake shoe against the vehicle wheel. This characteristic is counteracted to a certain degree by fade which is a function of energy absorption, a given shoe force providing a given retarding force for only one set of conditions. With high speed rapid transit automatic trains which normally utilize a composition type brake shoe, this characteristic may result in an undesirable, dangerously extreme retarding force during an open-loop or failure application as may be effected by parting of a train wire or train break-into, thereby creating a dangerous braking condition which should be avoided.

It is accordingly an object of the present invention to provide an automatic brake control system utilizing a feed-back control from a vehicle's motion in a closed-loop scheme to modify the braking force in a manner to maintain a retardation force directly proportional to that called for under all conditions.

It is a further object of the present invention to provide a novel closed-loop brake control scheme adapted to include either retardation rate control of braking or retardation force control of braking to effect a uniform retardation of the vehicle under all conditions during a brake application.

Summary

According to the present invention, there is provided a novel brake control system utilizing a closed-loop scheme including dynamic braking apparatus, pneumatic braking apparatus, load compensating apparatus, braking feedback apparatus and blending appartus to control and modify brake signals for regulating a pneumatic brake application in accordance with the rate of retardation, vehicle load and degree of dynamic braking effective, to provide consistent stop distance for any specific degree of brake application in order to facilitate automatic control of a vehicle. A modification of such system includes apparatus to feature retarding force control instead of the retarding rate control in the closed-loop scheme.

Figure 1:
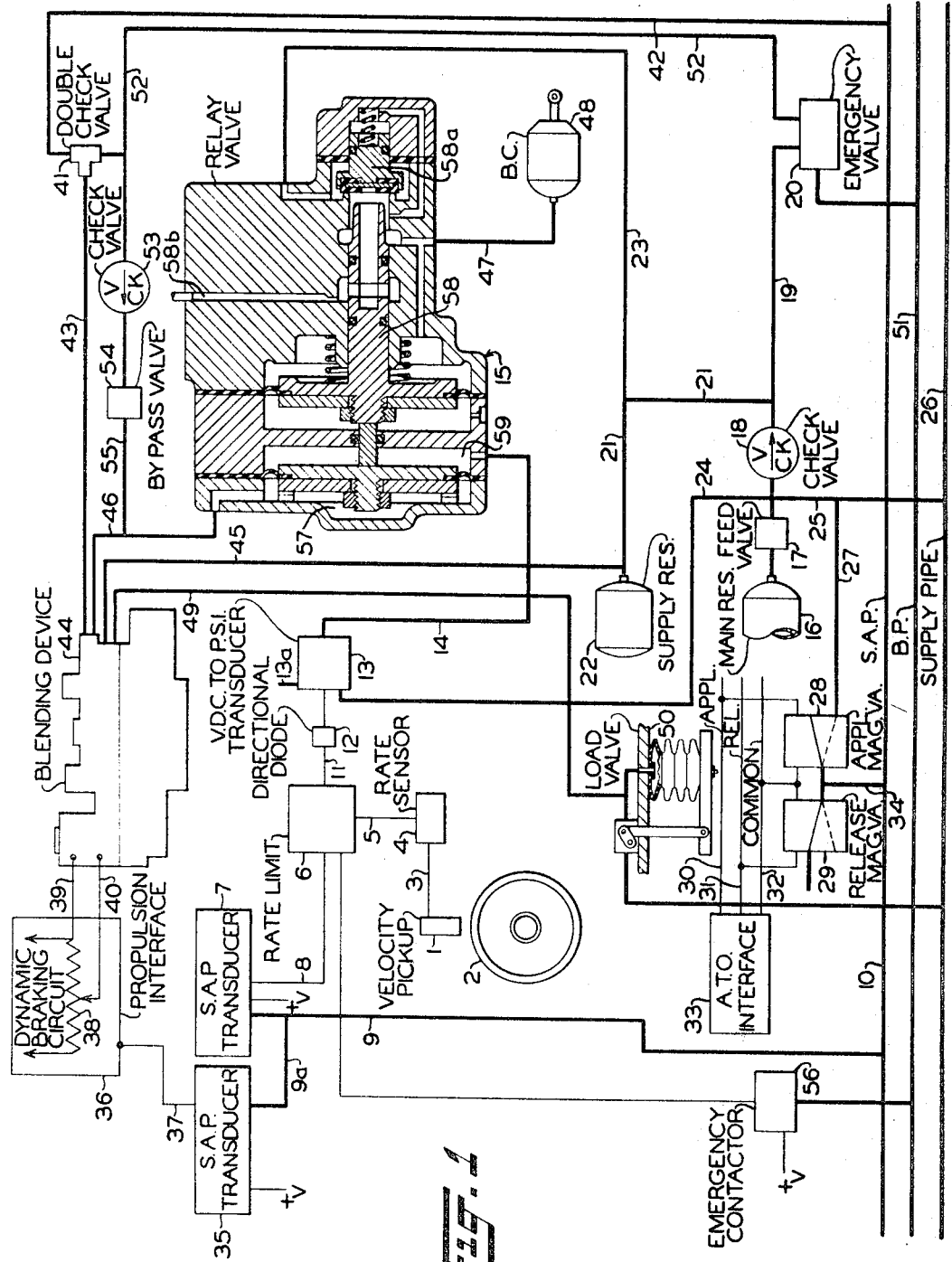
FIG. 1 shows a block diagram of the different basic component elements (some of which are shown in section) of the novel brake control system utilizing a closed-loop scheme having a retarding rate control.

Description—FIG. 1

As shown in FIG. 1, the brake control system includes a pick-up device 1 (usual axle driven gear and permanent magnet arrangement) associated with a vehicle wheel 2 for generating a voltage proportional to the rotational velocity of the vehicle wheel 2, said voltage being supplied via wire 3 to a rate sensor 4 where it is rectified and filtered by well-known R-C circuits and supplied by wire 5 to a rate limit device 6 as a direct current voltage proportional to the velocity of the vehicle wheel 2. The rate limit device 6 is an operational amplifier utilized as a summer and power amplifier for summing the input voltage from the rate sensor 4 and an opposing bias voltage from a straight-air pipe transducer 7 (explained hereinafter) supplied by way of a wire 8, to obtain a voltage which is amplified and supplied as an output voltage. The straight-air pipe transducer 7 is connected by pipe 9 to the straight-air pipe 10 and functions to convert the measure of straight-air pipe pressure to a direct current output voltage in wire 8 proportional to said pressure in pipe 9.

The output voltage of the rate limit device 6 is supplied via a wire 11 and a directional diode 12 to a self-lapping magnet valve type electric to pneumatic transducer 13 to effect a fluid pressure analog output proportional to the output voltage of said rate limit device 6. The fluid pressure analog output of the transducer 13 is supplied via pipe 14 to a differential or compensating type self-lapping relay valve device 15 (explained hereinafter) in a manner that increasing fluid pressure input from the pipe 14 results in reduction of fluid pressure output from the relay valve device 15 to cause a reduction in braking effect as explained hereinafter.

Fluid under pressure for the entire system is supplied from a main reservoir 16 via a feed valve 17 and check valve 18 to various supply pipes such as pipe 19 to an emergency valve 20, pipe 21 to a supply reservoir 22 and relay valve device 15 via pipe 23, pipe 24 to the transducer 13 and pipe 25 to a train supply pipe 26, with a branch pipe 27 from pipe 25 leading to an application magnet valve 28.

The application magnet valve 28 and an associated release magnet valve 29 operate in the usual well-known manner when selectively energized respectively by the application wire 30, release wire 31 and common return wire 32 powered from the A.T.O. (automatic train operation) interface 33 to regulate the supply of fluid under pressure to the straight air pipe 10 via pipe 34 when the application magnet valve is energized and vent said straight air pipe when the release magnet valve is energized.

The straight air pipe 10 pressurized responsive to energization of the application magnet valve 28 supplies pressure to a plurality of devices including:

(a) The straight air pipe transducer 7 to result in D.C. voltage output therefrom proportional to said straight air pipe pressure, said voltage being supplied to the rate limit device 6, (b) The straight air pipe transducer 35 via pipe 9a to result in a D.C. voltage output therefrom proportional to said straight air pipe pressure, said voltage being supplied to the electric traction system shown herein as the propulsion interface 36 by wire 37 for controlling the dynamic braking represented herein by the brake rheostat 38 connected by the wires 39 and 40 to a blending valve device described hereinafter, (c) And to a double check valve device 41 via pipe 42 which in turn effects delivery of straight air pipe pressure via pipe 43 to a load compensating blending valve device 44 of the type disclosed in U.S. Patent 3,275,380, issued September 27, 1966, to Harry C. May and assigned to the assignee of the present invention.

The load compensating blending device 44 operates in well-known manner, a detailed understanding of which is not necessary to an understanding of the present invention, but if so desired may be obtained from study of the aforementioned patent. Basically the blending device 44 receives an inshot pressure from reservoir 22 via the pipe 45. The input straight air pipe pressure from the pipe 43 monitors the fluid pressure from pipe 45 by blending or integrating means to supply a blended or resultant pressure, which automatically increases according to reduction in dynamic braking, via pipe 46 to the compensating relay valve device 15 where in cooperation with the pressure output of the transducer 13 via pipe 14 said relay valve device 15 positions a piston valve therein (described hereinafter) which in turn regulates the supply of fluid under pressure from the supply reservoir 22 via pipe 23 and said relay valve device to pipe 47 and thus to the brake cylinder 48.

Control of the output of the load compensating blending device is effected internally by a plurality of means controlled by:

(a) A dynamic brake feedback current as supplied via the wires 39 and 40 to a compensating magnet portion thereof, (b) A control fluid pressure, either straight air pipe pressure or emergency valve pressure supplied via pipe 43, (c) And a load compensating pressure in a pipe 49 supplied from a combined air spring and leveling valve device 50, a detailed explanation of which may be obtained from the aforementioned patent if so desired.

The emergency valve 20 operates responsively to a reduction of pressure in the brake pipe 51 at an emergency rate to supply maximum fluid pressure from the pipe 19 to the pipe 52 to shift the double check valve 41 to supply said maximum fluid pressure to the pipe 43 and the load compensating blending valve device 44 and also to supply said maximum fluid pressure via the check valve 53 and by-pass valve 54 to the pipes 55 and 46 and thence to the compensating relay valve device 15 to effect a maximum braking suitable for the empty weight of the car.

For loaded car conditions, the blending valve device 44 supplements this pressure supplied to relay valve device 15 to correspondingly increase the degree of fluid pressure supplied to the brake cylinder 48.

Emergency reduction of brake pipe pressure also causes an emergency contactor 56 to be actuated at zero brake pipe pressure to supply a fixed D.C. voltage to the rate limit device 6 at a value sufficient to substantially prevent the output therefrom from effecting operation of the transducer 13 to cause the relay valve device 15 to effect a reduction in the degree of braking established by the control fluid pressure being supplied to the relay valve device via pipe 46.

*Operation*

In operation, a brake application may be made by controlling the pressure in the straight-air pipe by control of the application and release magnet valves in a usual well-known manner in response to operation of a manually operated brake valve device (not shown) or a control programmer from the A.T.O. interface in a well-known manner to effect dynamic braking in well-known manner (explained hereinafter) and simultaneously pneumatic braking as needed.

Control of the energization of the train wires 30, 31 and 32 effects control of the energization of the application and release magnet valves 28 and 29 to control the charging of the straight-air pipe 10 in the usual manner. Deenergization of the release magnet valve 29 effects closing off of the venting of the straight-air pipe, and energization of the application magnet valve device 28 effects supply of fluid pressure to the straight-air pipe 10 by way of pipes 27 and 34. Deenergization of the application magnet valve 28 while the release magnet valve 29 is deenergized effects a lap condition in the straight-air pipe, and energization of the release magnet valve device 29 effects a release condition with venting of the straight-air pipe.

Straight-air pipe pressure is supplied from pipe 10 to pipe 42 and thence to the load compensating blending valve device 44 to cause an initial inshot of fluid under pressure to the relay valve device 15 and then as dynamic braking effect fades a regulated supply of fluid under pressure from supply reservoir 22 and pipe 45 under the control of straight-air pipe pressure from pipe 43 to pipe 46 and a chamber 57 of the relay valve device 15. Supply of fluid under pressure to chamber 57 of the relay valve device 15 effects operation of said relay device in a well-known manner to regulate a supply of fluid under pressure from the supply reservoir 22, pipe 21 and pipe 23 through said relay device 15 under the control of a diaphragm piston 58 and a supply valve 58a thereof to a pipe 47 and the brake cylinders, illustratively shown as one brake cylinder 48, to control the braking of the vehicle.

Straight-air pipe pressure is also supplied via pipe 9 to the transducer 7 to effect supply of a direct current voltage output therefrom which is proportional to the straight-air pipe pressure. The direct current voltage output from transducer 7 at wire 8 is supplied to the rate limit device 6. Also supplied to the rate limit device 6 is the direct current voltage output of the rate sensor device 4 which is proportional to the rate of retardation of the vehicle as determined by the alternating current voltage output of the pick-up device 1 which, in turn, is proportional (in degree and frequency) to the speed of the vehicle.

In the rate limit device 6, when the voltage supplied by the rate sensor device 4 at wire 5 exceeds the biasing voltage supplied by the transducer 7, a direct current voltage proportional to the difference between said aforesaid input voltages is supplied to the transducer 13 which is converted to a pneumatic pressure output therefrom at pipe 14 which is proportional to the degree of difference of the two input voltages at the rate limit device 6. The output pressure of the transducer 13 at pipe 14 is supplied to a compensating chamber 59 of the relay valve device 15 to effect opposition to the pressure in chamber 57 thereof to cause the diaphragm piston 58 to be moved in a manner to cause the supply valve 58a to close and open an exhaust passage 58b to stop the pressure supply to brake cylinder 48 and effect a pressure reduction therein in a well-known manner to thereby correspondingly reduce the braking effected.

It can thus be seen that during a braking operation, the initial braking effect will be in proportion to the straight-air pipe pressure as compensated at the head-compensating blending valve device 44 and supplied to the relay valve device 15. As the car speed is reduced, the dynamic braking effect fades and the blending valve automatically effects an increase in pneumatic braking effect by causing the relay valve 15 to supply an increased fluid pressure to the brake cylinder 48 to compensate for the said decrease in dynamic braking. Also, as the car speed reduces, the coefficient of friction between the brake shoes and the car wheels will increase and tend to cause an increased rate of retardation of the car. This increased rate of retardation is immediately sensed by the pick-up device 1 in the form of a voltage change at the rate sensor device 4 which, in turn, causes an increase in voltage supplied to the rate limit device 6 which, in turn, detects the difference between this voltage so supplied and that supplied by the transducer 7 such that an error signal or output voltage from said rate limit device 6 is delivered to the transducer 13 and changed to a proportionate pressure output at the transducer 13. The pressure output of the transducer 13 is supplied via pipe 14 to chamber 59 of the relay valve device 15 to operate the relay valve device 15 to effect such a reduction in fluid pressure supplied to the brake cylinder 48 as to inhibit the excessive rate of increase of retardation to a completed stop. It will be seen that the rate of retardation of the train is affected by two variable factors, namely (1) the reducing brake cylinder pressure, and (2) the increasing coefficient of friction between the wheel and brake shoe with decreasing train speed. The reduction of brake cylinder pressure effected by relay 15 in a given time interval is not such as to completely compensate for the increase in coefficient of friction between the wheel and brake shoe. Consequently, the rate of retardation of the train tends to continue to increase as the train decreases in speed toward a stop, but at a slower rate than would be the case if the brake cylinder pressure were not being simultaneously reduced. Consequently, the error signal supplied by the rate limit device as a measure of the increasing rate of retardation of the train causes the transducer 13 to supply a continually increasing fluid pressure to chamber 59 of relay 15, thus causing the relay to operate to continue to reduce the pressure of fluid supplied to the brake cylinder. However, the reduction in brake cylinder pressure is not sufficiently fast to completely compensate for the increase in the coefficient of friction between the wheel and the shoe resulting from reducing speed until the train reaches a stop. When the vehicle is brought to a stop, the error signal is reduced to zero and the transducer 13 will operate to completely vent the pipe 14 and connected chamber 59 of relay 15 by way of a vent pipe 13a in the transducer 13 to thereby render the relay 15 fully effective to cause a full service application or such other degree of application as called for by the degree of pressurization of the straight-air pipe.

For an operational example of the feedback system, assume the train is moving at 80 miles per hour and a full service brake application is made, resulting in a 2.7 miles per hour per second deceleration rate. In that the 2.7 miles per hour per second rate corresponds to a usual braking rate desired for a full service straight-air pipe pressure, the retardation rate does not exceed the predetermined limit and no brake rate reduction requirement of relay valve device 15 output is provided from the rate limit device 6 and the transducer 13. The biasing pressure delivered by pipe 14 to relay valve device 15 is so selected that a slightly greater than necessary reduction in braking takes place to effect bringing the degree of braking back to the desired level and then maintaining it at that value by modulation. As the retardation rate continues to vary with change of speed and consequent change of coefficient of friction, this modulation continues to vary the degree of braking in accordance with speed change. Because this system senses true retardation rate, it compensates for grade and rolling resistance within the capabilities of the braking equipment. It can thus be seen that the present equipment can only result in relay valve operation that does not override braking control by the relay and cannot augment such control, but can only effect desired reductions in braking.

Other features affecting the braking effect are incorporated at the blending valve device 44. These features include:

(a) Dynamic braking forces controlled by the output of transducer 35 which is proportional to the straight-air pipe pressure, with the degree of effective dynamic braking varying the degree of effective pneumatic brake at the blending device by supplying dynamic braking current to the blending valve device 44 in well-known manner described in the aforementioned patent, and (b) Vehicle suspension pressure variably controlling the degree of output pressure from the blending valve device in accordance with variance of load on the vehicle by way of fluid pressure supplied thereto by the well-known leveling valve and air spring device 50.

It can thus be seen that the final pneumatic braking forces effective is dependent on:

(a) Braking force called for by variance of straight-air pipe pressure,
(b) Degree of dynamic braking effective,
(c) Variation of vehicle load, and
(d) Rate of retardation of the vehicle.

Figure 2:
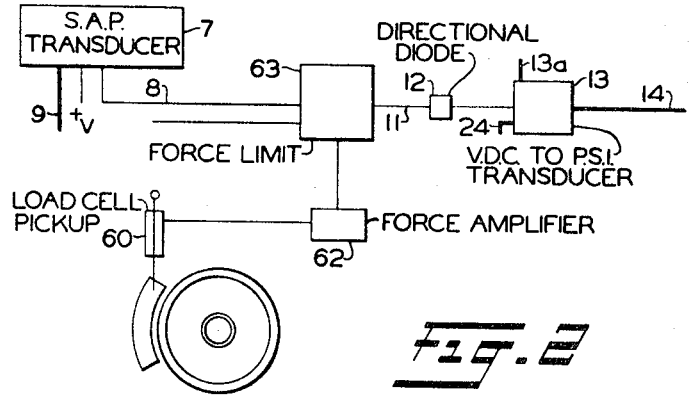
FIG. 2 shows a portion of closed-loop scheme having a retarding force control to be utilized with the brake system of FIG. 1.
Figure 3:
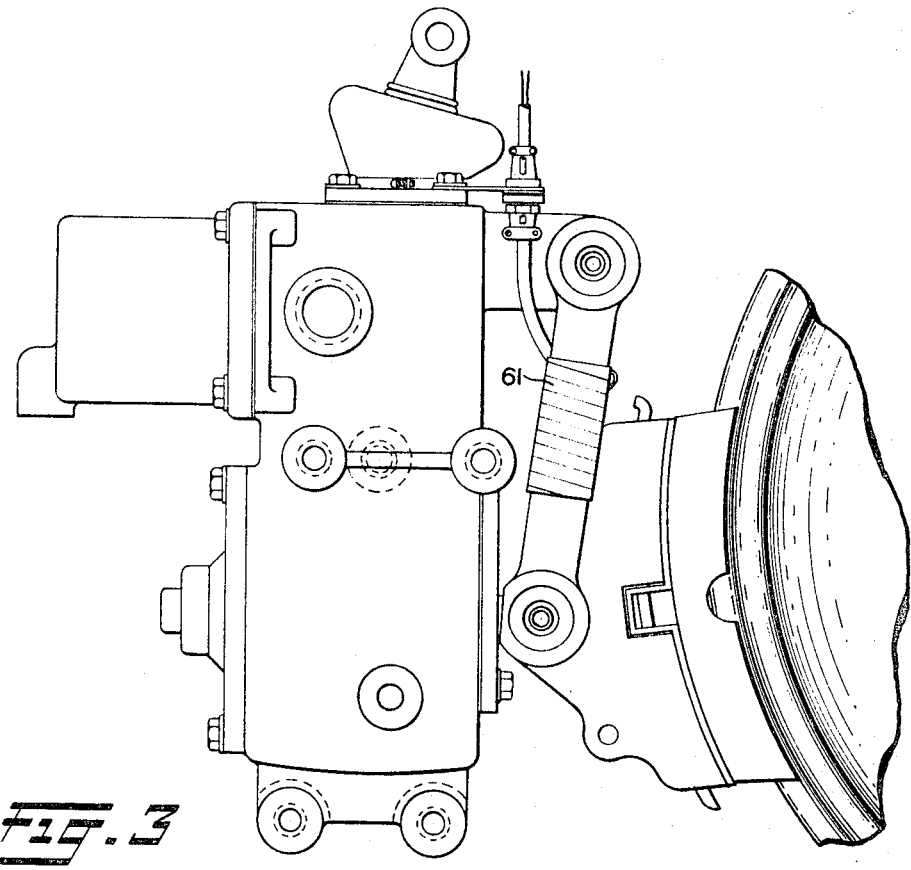
FIG. 3 shows an outline of a portion of the apparatus utilized in the closed-loop retarding force control to illustrate the means by which a measure of retarding force is obtained.

Another embodiment of this invention shown in FIG. 2 innvolves the substitution of a load cell pick-up means 60 for the velocity pick-up device 1 of FIG. 1. This is done by providing load cells 61 or strain gauges secured by any means such as weatherproof tape on the vehicle brake shoe hangers as shown in FIG. 3 and using the output voltage of these load cells 61 which is proportional to the retarding torque force exerted on the brake hangers as the dynamic braking fades. This output voltage is supplied to the load cell pick-up means 60 and thence to a force amplifier device 62 and force limit device 63 of FIG. 2 (similar to the rate sensor device 4 and rate limit device 6 of FIG. 1) to effect an output voltage from the force limit device 63 which is proportional to the difference between the voltage input thereto from the transducer 7 and the force amplifier device 62, in a manner similar to the operation of the rate limit device 6 of FIG. 1. The output of the force limit device 63 therefore is an error signal which is supplied via a directional diode 12 to the transducer 13 to effect operation thereof in a manner described in the description of operation of FIG. 1 to effect a biasing control of the relay valve device 15. It should be noted that the load cells are located on the brake hangers in a manner such that a measure of tension forces thereon is obtained if the wheel is rotating in one direction and a measure of compression forces is obtained if the wheel is rotating in the opposite direction. These measurements are very similar in degree and any differences therebetween may be preadjusted by biasing resistors. However, it has been found more convenient to utilize a second load cell similarly mounted on another hanger on the opposite side of the wheel and switch automatically to measurements from the second load cell with automatic reversal of all systems when the vehicle movement direction is reversed.

Having now described the invention, what I claim as new and desire to secure by Letters Patent is:

1. A brake control system for a wheeled vehicle having fluid pressure actuated braking means and dynamic braking means for applying a retarding force to the wheels, said system comprising in combination:

(a) relay valve means having two pressure chambers on opposite sides of an operating abutment for receiving fluid under pressure, an increase of pressure in one of which said chambers effects a supply of a braking fluid pressure in accordance with the degree of pressure therein, and establishment of fluid pressure in another of which said chambers while said one chamber is pressurized effects a reduction in the braking fluid pressure, (b) control means for establishing a fluid pressure in said one chamber variable in accordance with the combined effect of a selected degree of braking, the load on the vehicle, and dynamic braking, and (c) feed-back means for supplying a progressively increasing fluid pressure in said another chamber while said one chamber is pressurized, to effect a reduction of braking fluid pressure to thereby regulate braking fluid pressure so as to inhibit the increase in the rate of retardation of the vehicle occasioned by the increase in coefficient of friction of the braking means with reducing vehicle speed.

2. The combination according to claim 1 wherein said feed-back means for supplying a progressively increasing pressure in said another chamber includes means responsive to the rate of retardation of the vehicle.

3. The combination according to claim 1 wherein said feed-back means for supplying a progressively increasing pressure in said another chamber includes means responsive to the retardation torque force acting on the braking means.

4. The combination according to claim 1 wherein said means for supplying a progressively increasing pressure in said another chamber includes:
  (a) summing operational amplifier means subject to two different input signals and providing an output error signal proportional to the summation of the two input signals,
  (b) means providing one input signal to said summing operational amplifier means proportional to the retardation torque force acting on the braking means,
  (c) means providing a second input signal to said summing operational amplifier means proportional to a selected degree of a brake application,
  (d) transducer means responsive to the output signal of said summing operational amplifier means to effect supply of fluid pressure to the said another chamber.

5. The combination according to claim 1 wherein said means for supplying a progressively increasing pressure in said another chamber includes:
  (a) summing operational amplifier means subject to two different input signals and providing an output error signal proportional to the summation of the two input signals,
  (b) means providing one input signal to said summing operational amplifier means proportional to the rate of retardation of the vehicle,
  (c) means providing a second input signal to said summing operational amplifier means proportional to a selected degree of a brake application,
  (d) transducer means responsive to the output signal of said summing operaitonal amplifier means to effect supply of fluid pressure to the said another chamber.

6. The combination according to claim 5 wherein said means providing one input signal to said summing operational amplifier means includes:
  (a) velocity pick-up means operatively responsive to variable vehicle velocity to establish an accordingly variable electronic velocity signal, and
  (b) differentiating circuitry means operatively responsive to said electronic velocity signal to establish said one input signal to said summing operational amplifier means proportional to the rate of retardation of the vehicle.

7. Combination according to claim 5 wherein said means providing a second input signal to said summing operational amplifier means includes:
  (a) a control pipe having variously established therein a fluid pressure corresponding to a selected degree of a brake application, and
  (b) second transducer means for providing said second input signal to said summing operational amplifier means corresponding to the fluid pressure established in the control pipe.

8. The combination according to claim 1 wherein said control means for establishing fluid pressure in said one chamber includes:
  (a) control pipe having variously established therein a fluid pressure corresponding to a selected degree of a brake application, and
  (b) control valve means responsive to the fluid pressure established in said control pipe for supplying a corresponding fluid pressure to said one chamber of the relay valve means.

9. The combination according to claim 8 wherein the said control valve means includes means controlled according to the load on a vehicle for causing said control valve means to supply a fluid pressure to said one chamber of the relay valve means varying with variation of load on the vehicle.

10. The combination according to claim 8 wherein the said control valve means includes:
  (a) means providing a fluid pressure variable according to the load on the vehicle, and
  (b) means responsively controlled by the variable fluid pressure for causing said control valve means to supply a fluid pressure to said one chamber of the relay valve means varying with variation of the load on the vehicle.

11. The combination according to claim 1 wherein the said control means includes:
  (a) a control pipe having variously established therein a fluid pressure corresponding to a selected degree of brake application,
  (b) dynamic braking means characterized by a diminishing braking effect with diminishing vehicle speed,
  (c) means responsive to establishment of fluid pressure in the said control pipe for initiating operation of said dynamic braking means, and
  (d) control valve means conjointly controlled by said dynamic braking means and the fluid pressure in said control pipe for supplying a varying fluid pressure to said one chamber of the relay valve means to cause said relay valve means to progressively increase the braking fluid pressure in accordance with the characteristic decrease in dynamic braking effect.

12. Combination according to claim 7, further characterized by including:
  (a) dynamic braking means having a diminishing braking effect with diminishing vehicle speed,
  (b) means responsive to establishment of fluid pressure in said control pipe for initiating operation of the dynamic braking means, and
  (c) control valve means conjointly controlled by said dynamic braking means and the fluid pressure in said control pipe for supplying a varying fluid pressure to said one chamber of the relay valve means to cause said relay valve means to progressively increase the braking fluid pressure in accordance with the characteristic decrease in dynamic braking effect.

13. The combination according to claim 1 wherein said control means includes:
  (a) a control pipe having variously established therein a fluid pressure corresponding to a selected degree of brake application,
  (b) dynamic braking means characterized by a diminishing braking effect with diminishing vehicle speed,
  (c) load-responsive means providing a fluid pressure variable according to the load on the vehicle, and
  (d) control valve means conjointly controlled by said pressure in said control pipe, said dynamic braking means and said load-responsive means for supplying a varying fluid pressure to said one chamber of the relay valve means to cause said relay valve means to progressively increase the braking fluid pressure in accordance with the characteristic decrease in dynamic braking effect and in accordance with the load on said vehicle.

14. The combination according to claim 8, further including:
  (a) brake pipe means normally charged to a predetermined pressure, and
  (b) fluid pressure responsive emergency valve means operatively responsive to an emergency reduction of the pressure in said brake pipe means for supplying maximum fluid pressure to said one chamber of said relay valve means in by-pass of said control valve means.

15. The combination according to claim 5, further including:
(a) brake pipe means normally charged to a predetermined pressure, and
(b) fluid pressure responsive emergency contactor means responsive to emergency reduction of fluid pressure in said brake pipe for supplying to said summing operational amplifier means an additional signal for reducing the output error signal therefrom to zero to thereby render said transducer means effective to vent fluid pressure from said another chamber.

References Cited

UNITED STATES PATENTS 2,148,725  2/1939  Borde.
3,235,036  2/1966  Meyer et al.

DUANE A. REGER, *Primary Examiner.*

U.S. Cl. X.R.

303—21, 22